United States Patent [19]

Barsotti et al.

[11] Patent Number: 4,908,397

[45] Date of Patent: * Mar. 13, 1990

[54] MULTI-COMPONENT COATING COMPOSITION COMPRISING AN ANHYDRIDE CONTAINING POLYMER, A GLYCIDYL COMPONENT AND A SELF-STABILIZED DISPERSION RESIN

[75] Inventors: Robert J. Barsotti, Franklinville; Patrick H. Corcoran, Cherry Hill, both of N.J.

[73] Assignee: E. I. Du Pont de Nemours and Company, Wilmington, Del.

[*] Notice: The portion of the term of this patent subsequent to Mar. 28, 2006 has been disclaimed.

[21] Appl. No.: 212,053

[22] Filed: Jun. 27, 1988

[51] Int. Cl.[4] ............................ C08K 5/01; C08K 5/10; C08L 63/02

[52] U.S. Cl. .................................... 523/400; 523/437; 523/439; 525/74; 525/108; 525/113; 525/116; 525/117; 525/118; 525/119; 525/207; 525/208; 525/221; 525/94

[58] Field of Search ................... 523/400, 437, 439; 525/74, 108, 113, 116, 117, 118, 119, 207, 208, 221

[56] References Cited

U.S. PATENT DOCUMENTS

| | | | |
|---|---|---|---|
| 3,136,736 | 6/1964 | Washburne et al. | 525/119 |
| 4,452,948 | 6/1984 | Marrion et al. | 525/207 |
| 4,507,411 | 3/1985 | Gordon et al. | 523/436 |
| 4,591,533 | 5/1986 | Antonelli et al. | 428/520 |
| 4,732,791 | 3/1988 | Blackburn et al. | 427/407.2 |
| 4,816,500 | 3/1989 | Corcoran | 523/437 |

FOREIGN PATENT DOCUMENTS 0123793 1/1984 European Pat. Off. .
994881 6/1965 United Kingdom .

Primary Examiner—John Kight
Assistant Examiner—Frederick Krass
Attorney, Agent, or Firm—John M. Lynn

[57] ABSTRACT

A coating composition useful for a finish for automobiles and trucks in which the film forming binder contains reactive binder components of about (a) 25-94% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1-8 carbon atoms and the polymer has a weight average molecular weight of about 2,000-50,000;

(b) 5-50% by weight, based on the weight of the binder, of a glycidyl component having at least two reactive glycidyl groups;

(c) 1-40% by weight, based on the weight of the binder, of a self-stabilized dispersed resin; and the composition contains about 0.1-5% by weight, based on the weight of the binder, of a catalyst.

16 Claims, No Drawings

MULTI-COMPONENT COATING COMPOSITION COMPRISING AN ANHYDRIDE CONTAINING POLYMER, A GLYCIDYL COMPONENT AND A SELF-STABILIZED DISPERSION RESIN

This invention is related to a multi-component coating composition in a self stabilized dispersion resin.

There are a wide variety of multi-component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to finish original equipment, automobiles and trucks, refinish automobiles and trucks, paint structures such as bridges and buildings, paint appliances, metal cabinets and the like.

Representative of such compositions are shown in the following patents:

Gordon et al. U.S. Pat. No. 4,507,411, issued Mar. 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European Patent Application No. 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

U.S. Pat. No. 3,136,736 issued June 9, 1964, to Wyncote et al and British Pat. No. 994,881 assigned to Rohm and Haas concern coating compositions comprising polyepoxides and maleic anhydride copolymers. The patents do not teach or suggest the use of a self stabilized dispersed resin as in our invention.

U.S. Pat. No. 4,591,533 issued May 27, 1986, to Antonelli et al discloses the use of the self stabilized dispersed resin used in our invention. However, Antonelli does not teach or suggest the use of the self stabilized dispersed resin in an anhydride/glycidyl containing coating composition.

U.S. Pat. No. 4,732,791 issued Mar. 22, 1988, to Blackburn et al concerns a coating composition comprising polyepoxides, a monomeric anhydride curing agent and a low number average molecular weight hydroxy group containing polyfunctional function material. However, the composition disclosed must be heated to cure, contains monomeric as opposed to polymeric anhydride, and does not contain a self stabilized dispersed resin.

There is a need for a coating composition that cures at ambient temperatures and provides a high quality finish that is useful as an exterior finish or refinish for automobiles and trucks that has excellent adhesion to the substrate to which it is applied, good outdoor weatherability and humidity resistance and an excellent appearance.

SUMMARY OF THE INVENTION

A coating composition containing 20-80% by weight of reactive binder components and 80-20% by weight of an organic carrier:

the binder contains
(a) an anhydride acrylic polymer having at least two anhydride groups and having a weight average molecular weight of about 2,000-50,000;
(b) a component having at least two reactive glycidyl groups; and
(c) a self stabilized dispersed resin formed by polymerizing in solution the following constituents:
  (1) an acrylic solution polymer,
  (2) monomers of alkyl methacrylate or acrylate and hydroxy ethyl acrylate or methylacrylate, wherein either the acrylic solution polymer contains post reacted glycidyl methacrylate or acrylate or the monomers contain glycidyl methacrylate or acrylate, and
the composition contains about 0.1-5% by weight, based on the weight of the binder, of a catalyst.

DETAILED DESCRIPTION OF THE INVENTION

The film forming binder of the coating composition of this invention contains components that are mixed together before application. The film forming binder content of the composition is about 20-80% by weight of an organic carrier which usually is a solvent for the binder.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented to form a colored finish. Also, the composition can be used over plastic substrates used in automobiles and trucks such as filler panels, side panels, fender extensions, moldings and other trim parts.

The composition also can be pigmented to form a colored finish. These pigmented compositions are useful as exterior original equipment and refinish coatings for automobiles and trucks, as maintenance coatings for tanks, bridges, buildings such as factories and oil refineries and as industrial coatings for appliances, metal cabinets, shelves and the like.

Preferably, the coating composition has a high solids content and contains about 40-80% by weight binder and 20-60% by weight of organic solvent. The binder of the composition contains about 25-94% by weight of anhydride acrylic polymer containing at least two anhydride groups; 5-50% by weight of a glycidyl containing component and 1-40% by weight of self stabilized dispersed resin.

The anhydride acrylic polymer has a weight average molecular weight of about 2,000-50,000 determined by gel permeation chromatography using polymethyl methacrylate as a standard and preferably, has a weight average molecular weight of 3,000-25,000.

The anhydride acrylic polymer is prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride acrylic polymer is formed by polymerizing monomers of alkyl methacrylates, or alkyl acrylates or mixtures thereof, where the alkyl groups have 1–12 carbon atoms and ethylenically unsaturated anhydrides (or ethylenically unsaturated dicarboxylic acids which are converted to the acid anhydride during the polymerization). Optionally, the anhydride acrylic polymer can contain other components such as styrene, α-methyl styrene, acrylonitrile, methacrylonitrile in amounts of about 0.1–50% by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1–5% by weight of an ethylenically unsaturated acid such as acrylic acid, methacrylic acid, itaconic acid, maleic acid and the like.

Typically useful ethylenically unsaturated anhydrides are as a follows: itaconic anhydride, maleic anhydride, isobutenyl succinic anhydride and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxylic acids that can be used are itaconic acid, maleic acid, isobutenyl succinic acid and the like.

Preferred anhydride acrylic polymers are as follows: methyl methacrylate/butyl acrylate/itaconic anhydride, butyl acrylate/styrene/maleic anhydride/maleic acid, methyl methacrylate/butyl acrylate/itaconic anhydride.

The glycidyl component contains at least two glycidyl groups and can be an oligomer or a polymer. Typical glycidyl components are as follows: sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A., di- and polyglycidyl esters of acids, polyglycidyl ethers of isocyanurates, such as "Denecol" EX301 from Nagase. Sorbitol polyglycidyl ether, such as Araldite XUGY-358 ® from Ciba-Geigy, and di- nd polyglycidyl esters of acids, such as Araldite CY-182 ® from Ciba-Geigy, are preferred since they form high quality finishes.

Glycidyl methacrylate or acrylate containing acrylic polymers can be used such as random and block polymers of glycidyl methacrylate/butyl methacrylate. The block polymers can be prepared by anionic polymerization or by group transfer polymerization.

The self-stabilized dispersed resin is formed by polymerizing in solution the following constituents:
(1) an acrylic polymer;
(2) monomers of alkyl acrylate, alkyl methacrylate, and hydroxy acrylate or methacrylate. Conventional polymerization initiators such as t-butyl peracetate, and solvents are used. The constituents are heated to about 80°–250° C. for about 1–6 hours to form the resin.

The solution acrylate polymer is composed of polymerization monomers of alkyl methacrylate, alkyl acrylate, hydroxy alkyl acrylate or methacrylate and an ethylenically unsaturated carboxylic acid and optionally, monomers of styrene.

Typical alkyl methacrylates used to form the acrylic polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Typical alkyl acrylates used to form the acrylic polymer are methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Typical hydroxy alkyl acrylates and methacrylates are hydroxy ethyl acrylate, hydroxy propyl acrylate, hydroxy isopropyl acrylate, hydroxy propyl methacrylate, hydroxy isopropyl methacrylate, hydroxy butyl methacrylate and the like and mixtures of the above monomers.

Typical ethylenically unsaturated carboxylic acids that can be used are acrylic acid and methacrylic acid. Preferably, styrene is used to form the polymer with the above monomers.

One preferred acrylic polymer contains about 5–25% by weight styrene, 20–40% by weight butyl acrylate, 20–40% butyl methacrylate, 5–15% by weight hydroxy ethyl acrylate, 1–5% by weight acrylic acid and 10–20% by weight ethyl methacrylate and has a weight average molecular weight of about 7,000–15,000.

Another preferred acrylic polymer contains about 5–15% by weight styrene, 25–35% by weight butyl methacrylate, hydroxy ethyl acrylate, 1–5% by weight acrylic acid, 10–20% by weight ethyl methacrylate and 1–5% by weight glycidyl methacrylate post reacted with acrylic acid and has a weight average molecular weight of about 7,000–15,000.

Conventional polymerization techniques as described above for the anhydride acrylic polymer are used to prepare the acrylic polymer in the self stabilized dispersed resin.

Glycidyl methacrylate or acrylate is either post reacted with the carboxyl groups of the acrylic polymer in the self-estabilized dispersed resin or is one of the monomers that are polymerized with the acrylic polymer in the self-stabilized dispersed resin.

Any of the aforementioned alkyl methacrylates, alkyl acrylates, hydroxy alkyl acrylates or methacrylates, ethylenical unsaturated acids are monomers that can be used to prepare the self stabilized/dispersed resin. Other useful monomers are styrene, acrylonitrile, methacrylonitrile, acrylamide, methacrylamide, perfluoro alkyl methacrylates or acrylates, dicarboxylic acids such as itaconic acid and the like.

Typical solvents used to prepare the anhydride acrylic polymer, the acrylic polymer in the self-stabilized dispersed resin, and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above, certain alcoholic solvents are also useful the alcoholic solvents under certain use conditions convert portions of the anhydride to a half ester also useful as reactants in this system. Examples of such alcohols are propanol, isobutanol, methanol, isopropanol, tertiary butanol, n- butanol, propylene glycol monomethyl ether, ethylene glycol monobutyl ether, and other alcoholic solvents.

About 0.1–5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N$^1$,N$^1$-tetramethylethylenediamine, N,methyldiethanolamine, N,N-dimethyl-1,3-propanediamine and 1-dimenthylamino-2-propanol or quaternary ammonium salts such as tert-butyl ammonium bromide, benzyl trimethyl ammonium formate and the like.

The catalyst need not be added to the coating composition. After an article is coated, the article is passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The resulting coating can be dried and cured at ambient temperatures or can be cured at elevated temperatures of 60° to 200° C. At ambient temperatures, the coating dries to a tack free condition in about 180 minutes and in about 24 hours the coating is substantially cured. In about 5–7 days, the coating is completely cured. Coatings are applied to form a finish about 0.5–5 mils thick, and preferably 1–2 mils thick. The finish has excellent gloss, good adhesion to substrate, excellent weatherability, and high solids.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclobenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2-40 ,4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methylphenyl) benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolproane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlenesubstituted oxalic acid diamides, methyl-$\beta$-(3,5-di-t-butyl-4-hydroxyphenyl)propionate, $\alpha,\alpha'$-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkylsilane, 1,8-naphthalimides, $\alpha$-cyano-$\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl)-phenyl]benzotrizole and bis-[4-(1,2,2,6,6-pentamethyl-piperidyl)]2-butyl-2-[(3,5-t-butyl-4-hydroxyphenyl)methyl]propanedioate. The stabilizers can be sued in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably, electrostatic spraying is used. The coatings are baked at about 60° to 140° C. for about 10 to 40 minutes. In refinishing automobiles and trucks, the clear coating is applied to a color coat and then can be dried at ambient temperatures or baked to form a clear finish. The resulting clear coat or finish is about 1–5 mils thick, preferably 1–2 mils thick, and has excellent gloss, good adhesion to the color coat and excellent weatherability.

The composition can be pigmented to form a colored finish or primer. About 0.1–200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE 1

Anhydride Acrylic Polymer

An anhydride acrylic polymer was prepared by charging the following constituents into a reactor with a thermometer, stirrer, dropping funnel, nitrogen induction tube and condensor:

|  | Parts by Weight |
|---|---|
| Portion 1 | |
| Xylene | 182.4 |
| Butyl acetate | 20.2 |
| Portion 2 | |
| Methylmethacrylate monomer | 96.0 |
| Butylacrylate monomer | 293.4 |
| Xylene | 10.0 |
| Portion 3 | |
| Itaconic acid | 167.2 |
| Xylene | 59.8 |
| Portion 4 | |
| T-butylperacetate | 26.7 |
| Butyl acetate | 10.6 |
| Xylene | 6.7 |
| Total | 973.0 |

Portion 1 was charged into the reactor, covered with a nitrogen blanket and heated to its reflux temperature (approximately 135° C.). Portion 2 is added dropwise over a 180 minute period. Portion 3 is added simultaneously with portions 2 and 4 over a 180 minute period as 5 minute increment shots of solid itaconic acid followed with washings of xylene. Portion 4 was premixed and added dropwise simultaneously with portions 2 and 3 over a 200 minute period. The resulting composition is then held at reflux until 22 pounds of water per 100 gallon batch size are removed.

The resulting polymer composition had a weight solids content of 64-66% and the polymer had a Gardner-Holdt Viscosity of X-Z2. The polymer had a weight average molecule weight of 3500.

A nonaqueous acrylic resin dispersion was prepared by charging the following constituents into a reaction vessel equipped with a stirrer, a heating source and a reflux condenser:

|  | Parts by Weight |
|---|---|
| Portion 1 | |
| Isopropanol | 179.26 |
| Acrylic Polymer Solution (52% solids of an acrylic polymer of 15% styrene, 28% butyl methacrylate, 30% butyl acrylate, 10% hydroxy ethyl acrylate, 2% acrylic acid and 15% ethyl methacrylate having a weight average Mw of 10,000 in a solvent mixture of 82.2% xylene and 17.8% butanol) | 2254.05 |
| Mineral Spirits | 255.65 |
| Heptane | 1912.46 |
| Portion 2 | |
| Heptane | 28.75 |
| t-Butyl peroctoate | 4.68 |
| Portion 3 | |
| Methylmethacrylate monomer | 1459.69 |
| Hydroxyethyl acrylate monomer | 784.81 |
| Styrene monomer | 156.97 |
| Portion 4 | |
| Acrylic Polymer solution (53% solids of an acrylic polymer of 15% styrene, 28% butyl methacrylate, 30T butyl acrylate, 10% hydroxy ethyl acrylate, 2% acrylic acid and 15% ethyl methacrylate, 2.7% glycidyl methacrylate having a weight average Mw of 10,000 in a solvent mixture of 82.2% xylene and 17.8% butanol) | 1126.52 |
| Methyl methacrylate monomer | 125.57 |
| Methl acrylate monomer | 565.06 |
| Glycidyl methacrylate monomer | 47.05 |
| Heptane | 17.25 |
| Portion 5 | |
| Mineral Spirits | 638.63 |
| t-butyl peroctoate | 47.14 |
| Isobutanol | 127.31 |
| Portion 6 | |
| t-butyl peroctoate | 30.96 |
| Isobutanol | 255.65 |
| Portion 7 | |
| Heptane | 167.25 |
| Total | 10,184.71 |

Portion 1 is charged into the reaction vessel and heated to its reflux temperature Portion 2 is added to the reaction vessel mixed and held at reflux temperature for two minutes. Then portions 3 and 4 are added simultaneously with portions 5 over a 210 minute period to the reaction vessel while maintaining the resulting reaction mixture at its reflux temperature. Then the mixture is held at its reflux temperature for an additional 45 minutes. Portion 6 is added over a 90 minute period while maintaining the reaction mixture at its reflux temperature and then held at this temperature for an additional 90 minutes. Portion 7 is added and excess solvent is stripped off to give a 60% solidsacrylic resin dispersion.

A coating composition was prepared by thoroughly blending together the following constituents:

|  | Parts by Weight |
|---|---|
| Anhydride acrylic polymer (as prepared above) | 88.9 |
| Non-Aqueous Acrylic Resin Dispersion (as prepared above) | 28.4 |
| Propylene glycol monomethyl ether acetate (PM acetate) | 11.0 |
| Tinuvin 1130 ® (Ciba-Geigy UV Screener) | 2.3 |
| Tinuvin 292 ® (Ciba-Geigy hindered amine light stabilizer) | 1.5 |
| Araldite CY-184 ® (Ciba-Geigy epoxy resin) | 19.8 |
| 15% Dimethylethanolamine in propanol | 16.2 |
| Total | 168.1 |

The resulting coating composition was reduced to a spray viscosity of 35 seconds measured with a No. 2 Zahn Cup by adding butyl acetate.

The coating composition was sprayed onto a primed metal panel coated with a waterborne basecoat and cured at 180°-200° F. and provided a clear coat with excellent color, durability, humidity resistance and other film properties. The coating was also sprayed over solvent borne melamine cured basecoat at 240°-295° F. The resulting coating exhibited excellent color, durability, humidity resistance and other film properties.

EXAMPLE 2

An epoxy acrylic polymer was prepared by charging the following constituents into a reactor with a thermometer, stirrer, dropping funnel, nitrogen induction tube and condenser:

|  | Parts by Weight |
|---|---|
| Portion 1 | |
| Xylene | 200.0 |
| Portion 2 | |
| Butyl acrylate | 271.8 |
| Glycidyl methacrylate | 173.0 |
| Hydroxyethylacrylate | 49.4 |
| Portion 3 | |
| 75% tert-butylperacetate in mineral spirits | 22.2 |
| Xylene | 80.0 |
| Portion 4 | |
| Xylene | 49.4 |
| 75% tert-butylperacetate in mineral spirits | 2.5 |
| Total | 848.3 |

Portion 1 was charged into the reactor, covered with a nitrogen blanket and heated to its reflux temperature. Portions 2 and 3 were premixed and added simultaneously and dropwise to the reactor over a 300 minute period while holding the reactor at reflux temperature. Portion 4 was then premixed and added to the reactor over a 30 minute period. The reactor was held at reflux for a 30 minute period.

The resulting polymer composition had a weight solids content of 60% and the polymer had a Gardner-Holdt viscosity of C. The polymer had a weight average molecular weight of 4500.

A coating composition was prepared by thoroughly blending together the following constituents:

|  | Parts by Weight |
|---|---|
| Part 1 | |
| Triethylene diamine | 52.8 |
| Tinuvin 328 ® (UV absorber from Ciba-Geigy) | 42.3 |
| Tinuvin 144 ® (Hindered amine light stabilizer from Ciba-Geigy) | 42.3 |
| Isopropyl alcohol | 687.5 |
| Non-Aqueous Acrylic Resin Dispersion (as prepared in Example 1) | 812.5 |
| Xylene | 954.0 |
| Hexyl acetate | 28.4 |
| Part 2 | |
| Anhydride acrylic polymer (as prepared in Example 1) | 1451.7 |
| Part 3 | |
| Epoxy acrylic polymer (as prepared above) | 727.5 |
| Araldite XUGY-358 ® (sorbitolpolyglycidylether from Ciba-Geigy) | 200.7 |
| Total | 4999.7 |

The resulting coating composition was reduced to a spray viscosity of 31 seconds, measured with a No. 2 Zahn Cup by adding butyl acetate.

The coating composition was sprayed onto a primed metal panel coated with pigmented acrylic lacquer. The composition cured at ambient temperature and provided a film which was hard, glossy and durable.

We claim:

1. A coating composition comprising 20-80% by weight of reactive binder components and 80-20% by weight of an organic liquid carrier; wherein the binder consists essentially of about
   (a) 25-94% by weight, based on the weight of the binder, of an anhydride acrylic polymer having at least two reactive anhydride groups that consists of polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
   (b) 5-50% by weight, based on the weight of the binder, of a glycidyl component having at least two reactive glycidyl groups;
   (c) 1 to 40% by weight, based on the weight of the binder, of a self stabilized dispersed resin formed by polymerizing in solution the following constituents;
      (1) an acrylic solution polymer,
      (2) monomers of alkyl methacrylate or acrylate and hydroxy ethyl acrylate or methacrylate, wherein either the acrylic solution polymer contains post reacted glycidyl methacrylate or acrylate or the monomers additionally contain glycidyl methacrylate or acrylate, and
   the composition contains about 0.1-5% by weight, based on the weight of the binder, of a catalyst.

2. The coating composition of claim 1 in which the glycidyl component is selected from the group consisting of polyglycidyl ethers of low molecular weight polyols, epoxy resins of epichlorohydrin and bisphenol A, polyglycidyl esters of polyacids, polyglycidyl ethers of isocyanurates, glycidyl methacrylate or glycidyl acrylate containing acrylic polymers or compatible mixtures of any of the above.

3. The coating composition of claim 1 in which the anhydride acrylic polymer additionally contains about 0.1-50% by weight of monomers selected from the group consisting of styrene, acrylonitrile, methacrylonitrile and any mixtures thereof.

4. The coating composition of claim 1 in which the anhydride acrylic polymer has a glass transition temperature of 0° to 70° C. and a weight average molecular weight of about 3,000-25,000.

5. The coating composition of claim 3 in which the anhydride acrylic polymer consists essentially of 20-40% by weight, based on the weight of the anhydride acrylic polymer, of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride or ethylenically unsaturated dicarboxylic acid.

6. The coating composite which the acrylic solution polymer in the self-stabilized dispersed resin consists essentially of polymerized monomers of styrene, alkyl methacrylate, alkyl acrylate, hydroxy alkyl acrylate or methacrylate and acrylic acid or methacrylic acid.

7. The coating composition of claim 6 in which the acrylic solution polymer in the self-stabilized dispersed resin is post reacted with glycidyl methacrylate.

8. The coating composition of claim 6 in which the acrylic solution polymer in the self-stabilized dispersed resin consists essentially of 5–25% by weight styrene, 20–40% by weight butyl methacrylate, 20–40% by weight butyl acrylate, 5–15% by weight hydroxy ethyl acrylate, 1–5% by weight acrylic acid, 10–20% by weight ethyl methacrylate and has a weight average molecular weight of about 7,000–15,000.

9. The coating composition of claim 7 in which the acrylic solution polymer in the self-stabilized dispersed resin consists essentially of 5–25% by weight styrene, 25–35% by weight butyl methacrylate, 20–40% butyl acrylate, 5–15% by weight hydroxy ethyl acrylate, 1–5% by weight acrylic acid, 10–20% by weight ethyl methacrylate and 1–5% by weight glycidyl methacrylate post reacted with acrylic acid and has a weight average molecular weight of 7,000 to 15,000.

10. The coating composition of claim 9 in which the glycidyl component comprises a polyglycidyl ether of a polyol or a di- or polyglycidylester of an acid 11. The coating composition of claim 10 in which the anhydride acrylic polymer consists of polymerized monomers of methyl methacrylate, butyl acrylate and itaconic acid.

12. The coating composition of claim 10 in which the anhydride acrylic polymer consists of polymerized monomers of butyl acrylate, maleic anhydride and maleic acid and in addition styrene.

13. The coating composition of claim 5 in which the anhydride acrylic polymer consists essentially of polymerized monomers of methyl methacrylate, styrene, butyl acrylate and itaconic anhydride;

and the glycidyl component consists essentially of sorbitol polyglycidyl ether or the di- or polyglycidylester of an acid or a mixture thereof and the catalyst is triethylene diamine or dimethyl ethanol amine or a mixture thereof.

14. The coating composition of claim 5 in which the anhydride acrylic polymer consists essentially of polymerized monomers of methyl metghacrylate butyl acrylate, styrene, maleic anhydride and maleic acid;

and the glycidyl component consists essentially of sorbitol polyglycidyl ether or the di- or polyglycidylester of an acid or a mixture thereof and the catalyst is triethylene diamine or dimethyl ethanol amine or a mixture thereof.

15. The coating composition of claim 1 containing about 0.1–200% by weight, based on the weight of the binder, of pigment.

16. The coating composition of claim 1 in which the anhydride acrylic polymer additionally contains up to about 40% by weight of polymerized monomers selected from the group consisting of alkyl acrylate or alkyl methacrylate having 9–12 carbon atoms in the alkyl groups or mixtures thereof.

* * * * *